(12) United States Patent
Younan

(10) Patent No.: US 9,316,092 B2
(45) Date of Patent: Apr. 19, 2016

(54) ARCTIC WALKER FOR HYDROCARBON EXPLORATION

(71) Applicant: Adel H. Younan, Sugar Land, TX (US)

(72) Inventor: Adel H. Younan, Sugar Land, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 0 days.

(21) Appl. No.: 14/417,740

(22) PCT Filed: Jul. 12, 2013

(86) PCT No.: PCT/US2013/050377
§ 371 (c)(1),
(2) Date: Jan. 27, 2015

(87) PCT Pub. No.: WO2014/046770
PCT Pub. Date: Mar. 27, 2014

(65) Prior Publication Data
US 2015/0211337 A1    Jul. 30, 2015

Related U.S. Application Data

(60) Provisional application No. 61/703,115, filed on Sep. 19, 2012.

(51) Int. Cl.
*E21B 41/00* (2006.01)
*E21B 43/01* (2006.01)
(Continued)

(52) U.S. Cl.
CPC ........... *E21B 41/0007* (2013.01); *B60F 3/0061* (2013.01); *B63B 35/12* (2013.01); *B63H 19/08* (2013.01); *E21B 7/12* (2013.01); *E21B 43/01* (2013.01)

(58) Field of Classification Search
CPC ....... B60F 3/0061; B63B 35/12; B63H 19/08; E21B 41/0007; E21B 43/01; E21B 7/12
See application file for complete search history.

(56) References Cited

U.S. PATENT DOCUMENTS 2,551,967 A * 5/1951 Pouliot ............................ 114/42
3,822,558 A   7/1974 Blankenship
(Continued)

FOREIGN PATENT DOCUMENTS

| GB | 2464458 A | 4/2010 |
|----|-----------|--------|
| WO | WO 2007/089152 | 8/2007 |
| WO | 2013/162790 A1 | 10/2013 |

OTHER PUBLICATIONS

Melling, H., et al., "Draft and Movement of Pack Ice in the Beaufort Sea: A Time-Series Presentation Apr. 1990-Aug. 1999," 2004, Canadian Technical Report of Hydrography and Ocean Sciences 238, Institute of Ocean Sciences, Sidney, BC.

(Continued)

*Primary Examiner* — James G Sayre
(74) *Attorney, Agent, or Firm* — ExxonMobil Upstream Research Law Department (57) ABSTRACT

A marine vessel for hydrocarbon exploration and methods of utilizing the same. In some embodiments, the vessel is enhanced with deployable and adjustable land propulsion mechanisms controlled by an active system to maintain position when on top of a drifting ice floe, water propulsion devices connected to the vessel hull capable of station-keeping in open water and/or within broken sea ice, sufficient power and flexibility to enable riding an ice floe, and at least one deployable ice hole cutter to open a channel through the ice floe.

19 Claims, 6 Drawing Sheets

(51) Int. Cl.
  *B63H 19/08* (2006.01)
  *E21B 7/12* (2006.01)
  *B63B 35/12* (2006.01)
  *B60F 3/00* (2006.01)

(56) References Cited

U.S. PATENT DOCUMENTS

| | | | |
|---|---|---|---|
| 3,965,835 A * | 6/1976 | Bennett | 114/42 |
| 4,170,187 A * | 10/1979 | Schirtzinger | 114/264 |
| 4,324,077 A | 4/1982 | Woolslayer | |
| 4,658,751 A * | 4/1987 | Koot | 440/12.63 |
| 7,681,674 B1 | 3/2010 | Barnes et al. | |
| 7,806,207 B1 * | 10/2010 | Barnes et al. | 180/8.1 |
| 8,051,930 B1 | 11/2011 | Barnes et al. | |
| 2003/0216092 A1 * | 11/2003 | Dornier, II et al. | 440/36 |
| 2010/0126401 A1 * | 5/2010 | Kokkinis | 114/144 B |
| 2011/0017118 A1 * | 1/2011 | Jean-Paul | 114/264 |
| 2012/0291684 A1 * | 11/2012 | Humphreys | 114/40 |

OTHER PUBLICATIONS

API (2005), "Design and Analysis of Stationkeeping Systems for Floating Structures, Appendix I—Global Analysis Guidelines for Deepwater Floating Systems," *API Recommended Practice 2SK*, Third Edition, pp. 145-169.

Hamilton, J.M. et al., "Ice Management for Support of Arctic Floating Operations," Proceedings of First Arctic Technology Conf., Feb. 7-9, 2011, Houston, TX, 14 pgs.

Hamilton, J.M. et al., "Simulation of Ice Management Fleet Operations Using Two Decades of Beaufort Sea Ice Drift and Thickness Time Histories," Proceedings of the $21^{st}$ International Offshore and Polar Engineering Conf., Jun. 19-24, 2011, Maui, Hawaii, pp. 1100-1107.

Maddock, B. et al., "Advances in Ice Management for Deepwater Drilling in the Beaufort Sea," Proceedings of the $21^{st}$ International Conf. on Port and Ocean Engineering Under Arctic Conditions, Jul. 10-14, 2011, Montreal, Canada, 14 pgs.

Wetmore, S.B., "The Concrete Island Drilling System: Super Series (Super CIDS)," OTC 4801, Proceeding of the 16th Annual Offshore Technology Conf., May 7-9, 1984, Houston, TX, pp. 215-221.

* cited by examiner

ARCTIC WALKER FOR HYDROCARBON EXPLORATION

CROSS-REFERENCE TO RELATED APPLICATION

This application is the National Stage of International Application No. PCT/US2013/050377, filed 12 Jul. 2013, which claims the priority benefit of U.S. Provisional Patent Application 61/703,115 filed 19 Sep. 2012 entitled ARCTIC WALKER FOR HYDROCARBON EXPLORATION, the entirety of which is incorporated by reference herein.

FIELD OF INVENTION

This invention generally relates to the field of offshore hydrocarbon exploration and, more particularly, to offshore exploration vessels capable of station-keeping during heavy ice conditions.

BACKGROUND

This section is intended to introduce various aspects of the art, which may be associated with some embodiments of the present invention. This discussion is believed to assist in providing a framework to facilitate a better understanding of particular aspects of the present invention. Accordingly, it should be understood that this section should be read in this light, and not necessarily as admissions of prior art.

There was never a shortage of challenges facing the offshore industry in deep-water or arctic frontiers. Nowadays, however, the challenge is particularly daunting with the merger of the two frontiers in new arctic deep-water leases, such as the Beaufort Sea, Chuckchi Sea, Kara Sea and elsewhere. The main challenge can be succinctly summarized in two words: station-keeping.

Take, for example, a concrete island drilling structure. This shallow-water mobile offshore drilling unit was designed by Global Marine to withstand about 59,000 tonnes of ice load in around 17 meters of water depth. Wetmore, 1984. As water depth increases, ice loads do not increase much, but overturning moment does typically prohibit the use of fixed-base structures beyond a limiting depth of about 100 m. In fact, the 100 m depth typically delineates the boundary between shallow and deep zones in arctic waters. As a result, this shifts the focus for the developers of those leases to floating platforms and drill ships.

The next boundary that faces the industry is that of mooring system capacity. Floating systems, such as Hoover-Diana, are held in place by a mooring system with a capacity in the range of 1,000-2,000 tonnes. See API RP2SK, 2005. Unfortunately, this capacity pales in comparison with sea ice load magnitudes, not to mention iceberg loads. Dynamically-positioned drill ships rely on azimuthing thrusters for station-keeping. While the azimuthing thrusters are capable of adequate station-keeping on non-ice conditions, they have much lower capacity to withstand ice loads.

Subsea developments may end up being the viable concept for arctic deep-water development, but some operations still need to be conducted at the surface: i.e., a drillship drilling a subsea well, a tanker loading crude, or other. As a result, offshore operations utilizing known technology have to consider operating only during the open water season.

In higher arctic, however, the season exhibits a scarcity and a variance of open water weeks over the years. At the Ajurak block in the Canadian Beaufort Sea, for example, the open water season lasts between 0 and 24 weeks, with a median of about 9 weeks. Further, the open water season may simply not be sufficient; other means, such as ice management, will likely have to play an essential role to extend the operational season beyond the period of open water, as well as to protect operations against ice floe intrusions during the open water season.

Thus, there is a need for improvement in this field.

SUMMARY OF THE INVENTION

The present disclosure provides an arctic walker for offshore exploration having improved station-keeping capabilities.

One embodiment of the present disclosure is a marine vessel comprising: a hull having a height defining a first length; a plurality of land propulsion mechanisms positioned adjacent to the hull; a plurality of water propulsion devices connected to the hull; an ice cutter operatively connected to the vessel, the ice cutter having an ice cutter length greater than the first length; and a control system operatively connected to the plurality of land propulsion mechanisms, the ice cutter and the plurality of water propulsion devices, the control system is constructed and arranged to control the position of the vessel with respect to the wellhead by operation of the plurality of land propulsion mechanisms or the plurality of water propulsion devices or a combination thereof.

The foregoing has broadly outlined the features of one embodiment of the present disclosure in order that the detailed description that follows may be better understood. Additional features and embodiments will also be described herein.

BRIEF DESCRIPTION OF THE DRAWINGS

The present invention and its advantages will be better understood by referring to the following detailed description and the attached drawings.

It should be noted that the figures are merely examples of several embodiments of the present invention and no limitations on the scope of the present invention are intended thereby. Further, the figures are generally not drawn to scale, but are drafted for purposes of convenience and clarity in illustrating various aspects of certain embodiments of the invention.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

One embodiment of the present disclosure is a marine vessel having an arctic class vessel with station-keeping thrusters allowing station-keeping in open-water and within broken sea ice when managed by icebreakers. For stronger multi-year ice, typically unmanageable, the marine vessel according to certain embodiments is enhanced with: (1) deployable and adjustable wheels controlled by an active system to maintain position when on top of a drifting ice floe; (2) sufficient power and flexibility to enable riding an ice floe; and (3) at least one deployable ice hole cutter located upstream of the drilling riser (umbilical, pipeline, etc.) to open a wide-enough channel through the ice and protect the riser (umbilical, pipeline, etc.). In some embodiments, the ice cutter(s) can be relocated to accommodate changes in ice drift direction.

Figure 1:
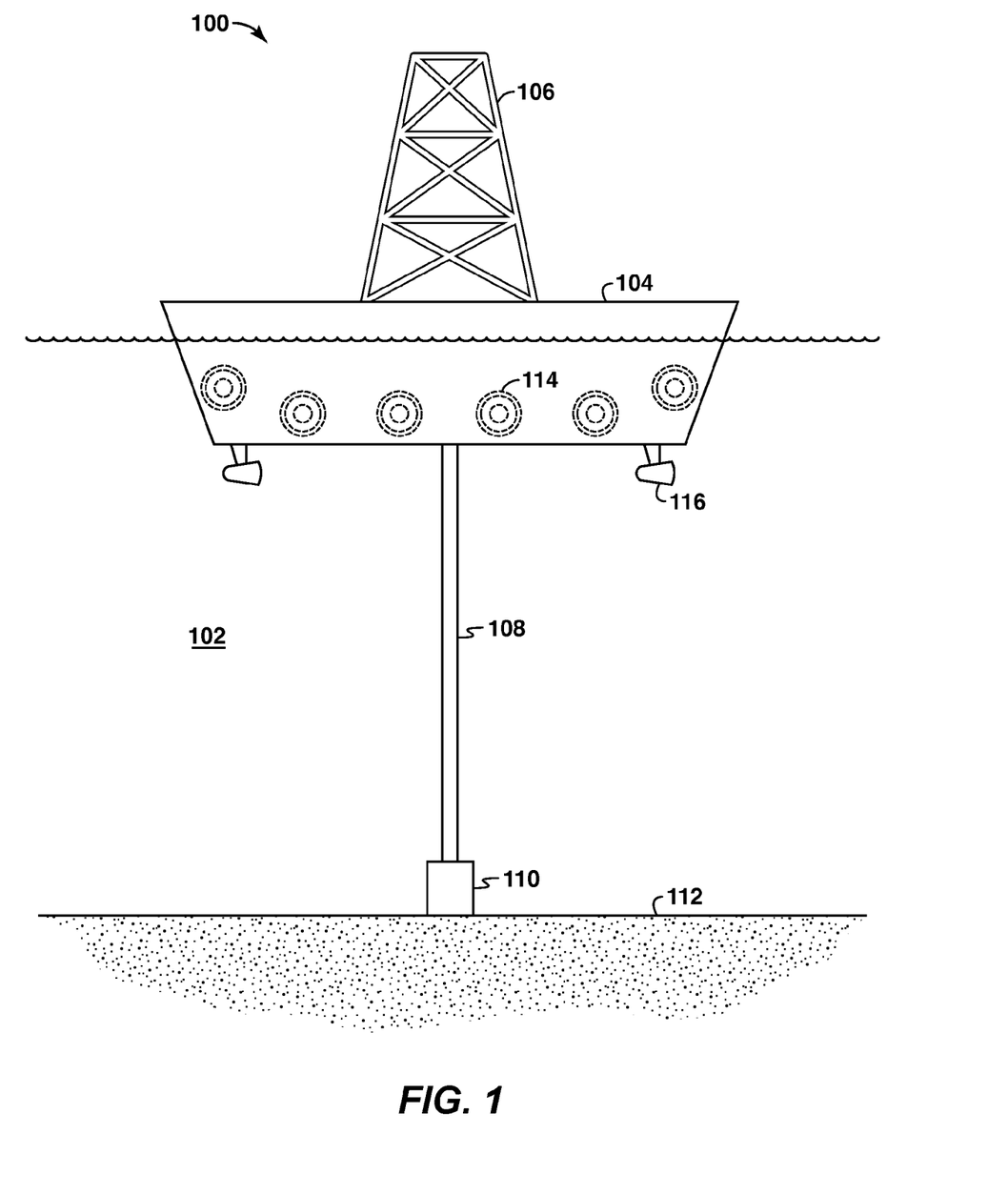
FIG. 1 is a side view of an arctic walking system according to one embodiment of the present disclosure.

An arctic walking system according to one embodiment of the present disclosure is depicted in FIG. 1. In the depicted embodiment, arctic walker 100 comprises a hull 104 to which a plurality of water propulsion devices 116 are attached. In some embodiments, hull 104 is an arctic class hull and/or is ice-strengthened to resist ice loads caused by the ice conditions in which arctic walker 100 is intended to operate. The shape and configuration of the hull 104 may be, but is not limited to, ship-shaped, substantially oblong, or axi-symmetric. Propulsion devices 116 are known to those skilled in the art and may be any type of propeller, thruster, propulsor, or water jet, to name a few non-limiting examples. The propulsion devices may be operated using known techniques for station-keeping of the arctic walker 100 while in body of water 102. While two propulsion devices 116 are depicted, other embodiments may include any number of propulsion devices 116 or no propulsion devices at all.

Arctic walker 100 is also equipped with a drilling derrick 106 which is constructed and arranged to operate drilling riser 108. Riser 108 is attached to a wellhead 110 proximate to seabed 112. Based on system design, riser 108 may alternatively be connected to a different type of riser terminus. As appreciated by those skilled in the art, the riser terminus may be a BOP, LMRP or other subsea connection. Riser 108 is constructed and arranged according to known techniques and passes drilling materials such as, but not limited to, drilling fluid, drill bit(s) and string, casings, and cement.

The arctic walker of the present disclosure is not limited to drilling operations. Such variations of the depicted embodiment may not include drilling derrick 106. In some embodiments, the arctic walker includes one or more production risers which would connect arctic walker 100 to a subsea wellhead. In other embodiments, the arctic walker may be equipped to service a subsea station or engage in arctic off-loading of hydrocarbons.

Returning to the FIG. 1 embodiment, arctic walker 100 is further equipped with a plurality of wheels 114 positioned at various locations on or within hull 104. As depicted, wheels 114 are in a retracted configuration. According to embodiments of the present disclosure, such a configuration may be suitable when arctic walker 100 is floating and operating in a body of water 102 that is substantially free of ice or when separate icebreakers have adequately managed the sea ice.

Figure 2:
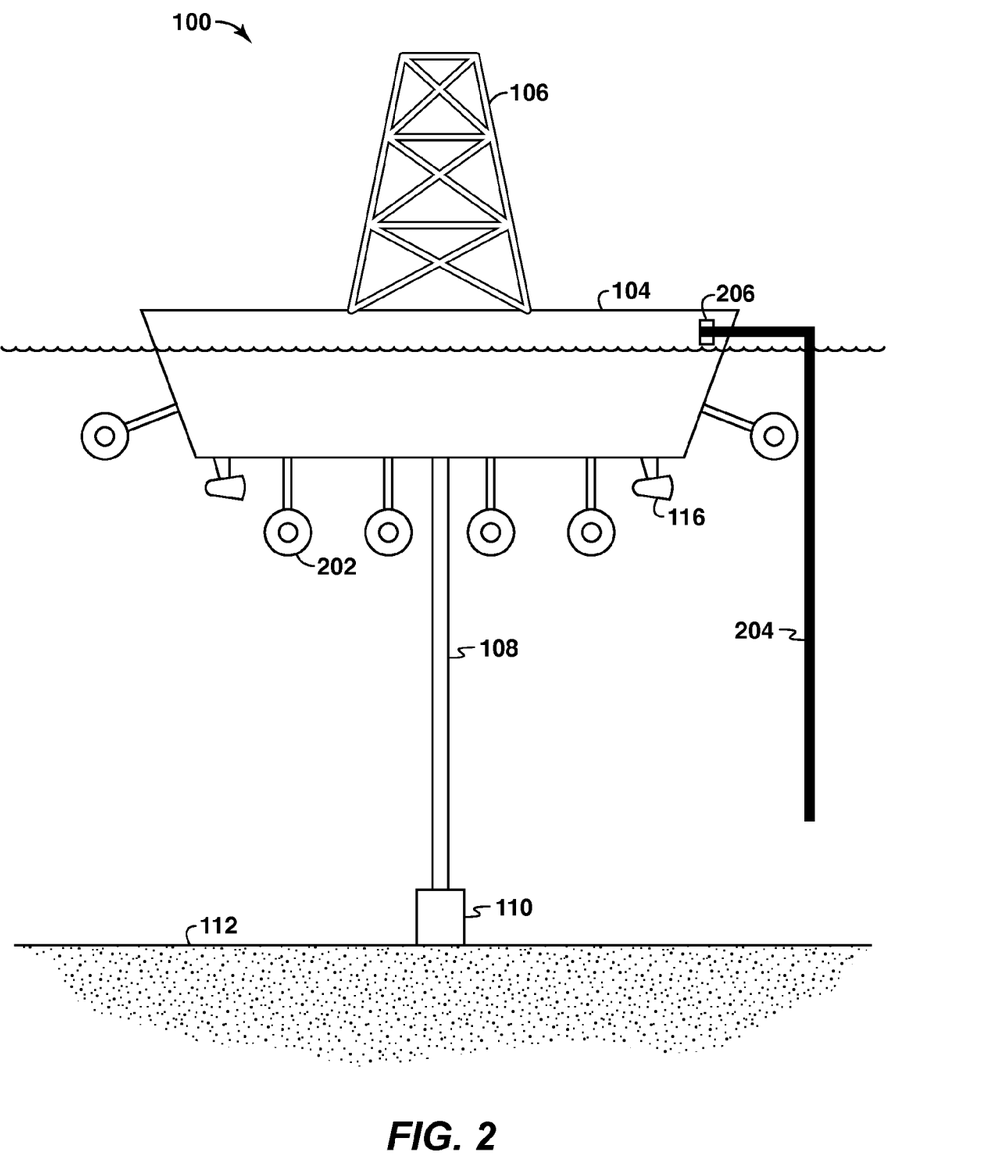
FIG. 2 is a side view of an arctic walking system in which the cutter is extended according to one embodiment of the present disclosure.

As explained in greater detail below, equipment onboard and/or communicating with arctic walker 100 may determine that ice is moving in the direction of arctic walker 100. Instead of engaging in the timely process of releasing the drilling riser 108 from wellhead 110 and removing the riser 108 section by section, arctic walker 100 is constructed and arranged to maintain the connection of riser 108 by "riding" the ice floe and cutting an opening in the ice sufficient for riser 108 to slide through as the ice drifts passed wellhead 110. FIG. 2 is a side view of an arctic walking system configured to address oncoming ice according to one embodiment of the present disclosure. As depicted, previously retracted wheels are moved to a deployed wheel position 202. Further, an ice cutter 204 is deployed through a cutter opening 206 in the hull 104. In other embodiments, ice cutter 204 is deployed from the deck of the arctic walker 100 and there is no need for opening 206. Ice cutter 204 may take a variety of forms, such as, but not limited to, a rotary cutting device or reciprocating saw.

In some embodiments, ice cutter 204 is constructed and arranged to not only withstand the forces exerted on it by impending ice floes, but also cut through thick layers of ice at least as quickly as the ice floe is moving. Ice cutter 204 may be constructed to any length depending on its design, location and the environmental conditions of intended application. In one embodiment, ice cutter 204 has enough length to a water depth of 30 meters.

While the depicted embodiment illustrates a single ice cutter 204, other embodiments of arctic walker according to the present disclosure may be equipped with multiple ice cutters. Such embodiments would have an improved ability to address abrupt changes in ice floe direction. In the depicted embodiment, ice cutter 204 is deployed via opening 206 when oncoming ice is detected. In some embodiments, ice cutter 204 is raised when not in use and no oncoming ice is detected.

Figure 3:
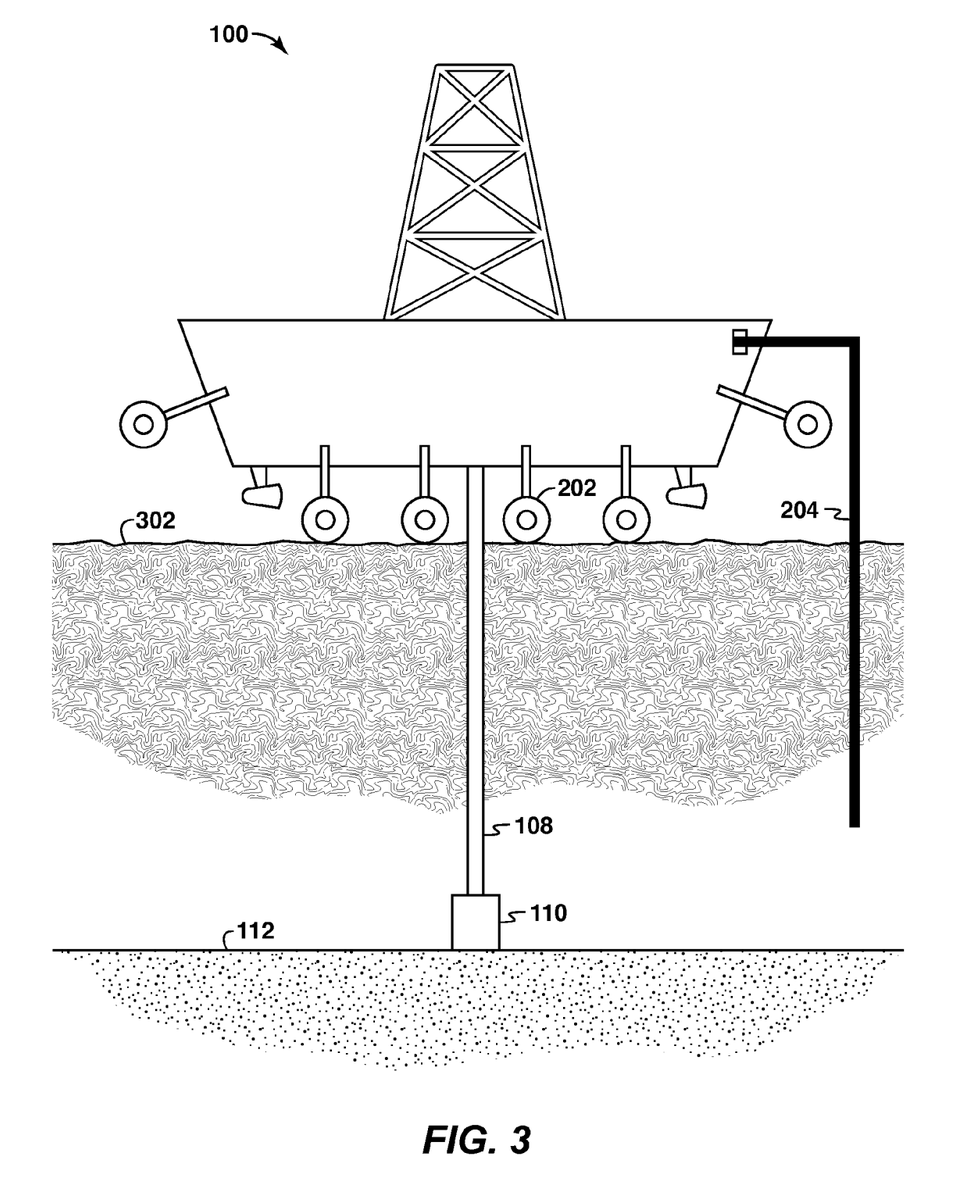
FIG. 3 is a side view of an arctic walking system while traversing ice according to one embodiment of the present disclosure.
Figure 4:
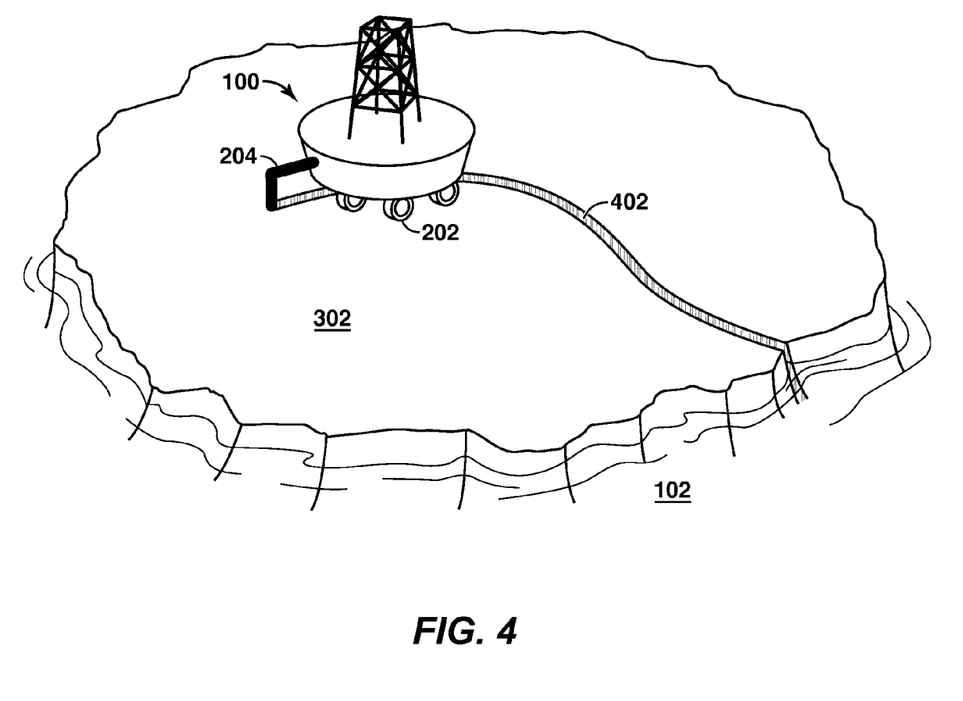
FIG. 4 is a top, perspective view of the arctic walking system depicted in FIG. 3.

FIG. 3 is a side view and FIG. 4 is a perspective view of an arctic walking system while traversing ice according to one embodiment of the present disclosure. As shown, deployed wheels 202 enable the arctic walker 100 to maintain position over the ice 302. Ice cutter 204 is constructed and arranged to cut a path 402 into ice 302 wide enough for riser 108 to pass through. Based on information received by arctic walker 100, such as, but not limited to, position of arctic walker 100, speed and orientation of arctic walker 100, ice floe direction and speed, the deployed wheels 202 are operated to ensure cutter 204 is in the proper position, i.e., directly upstream from the riser 108. In some embodiments, each deployed wheel 202 may be independently operable to enable efficient and accurate control of the speed and direction of arctic walker 100 while on ice 302.

Figure 5:
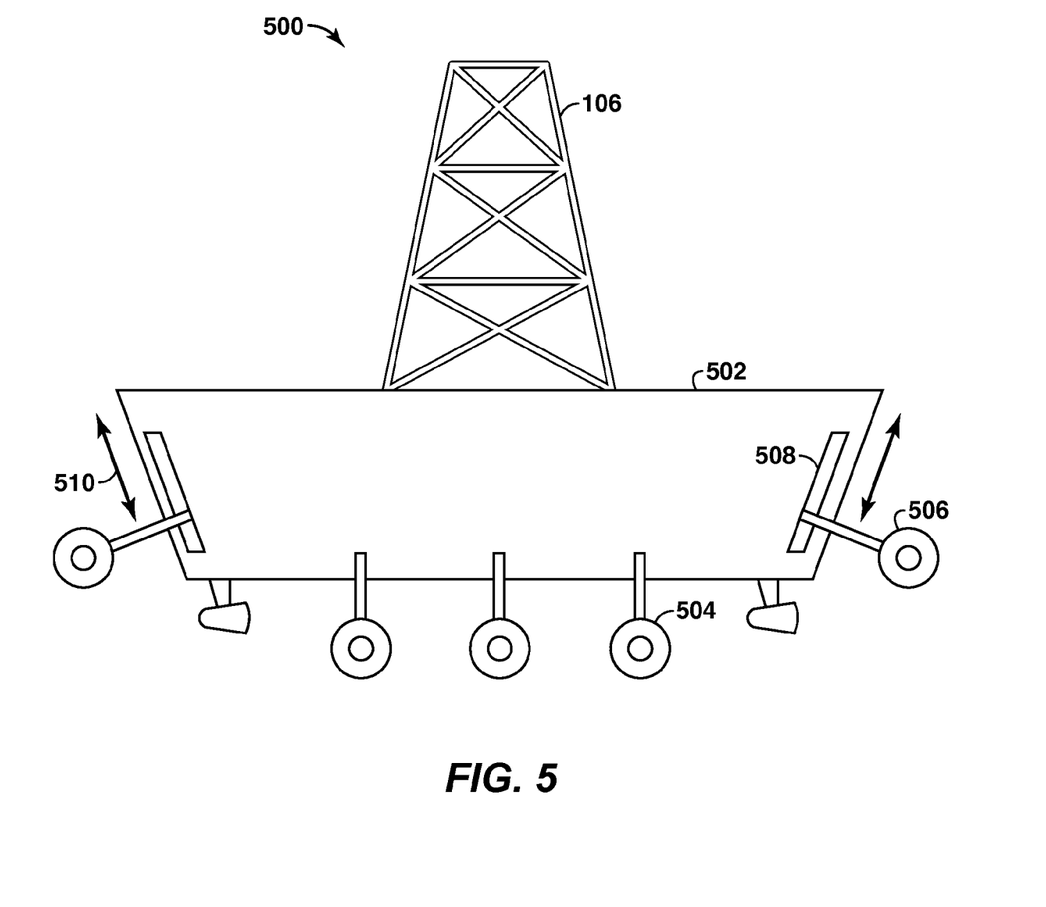
FIG. 5 is a side view of an arctic walking system according to another embodiment of the present disclosure.

FIG. 5 is a side view of an arctic walker 500 according to another embodiment of the present disclosure. The arctic walker 500 contains many of the components depicted in FIG. 1; however, for clarity, a majority of the common components are not depicted in FIG. 5. As depicted, arctic walker 500 has an alternate hull design 502 as compared to arctic walker 100. Arctic walker 500 is equipped with deployable wheels having two distinct capabilities. Wheels 504 are positioned along the bottom of hull 502 whereas wheels 506 are positioned along the angled portion of hull 502 between the deck and the bottom. While deployable, wheels 504 are fixed laterally with respect to the bottom of the hull 502. In contrast, wheels 506 are constructed and arranged to move laterally within track or opening 508 in addition to being deployable. Arrow 510 depicts the possible movement of wheels 506 within opening 508.

The movement of adjustable wheels 506 may assist in arctic walker 500 riding onto a ridge of ice depending on the height of the ice ridge and/or location of the water level with respect to the hull 502. In some embodiments, a plurality of adjustable wheels 506 and corresponding openings 508 are positioned around the entire perimeter of the hull 502 at spaced intervals. In other embodiments, the placement of the adjustable wheels 506 and corresponding openings 508 are limited to the area proximate to the ice cutter.

Figure 6:
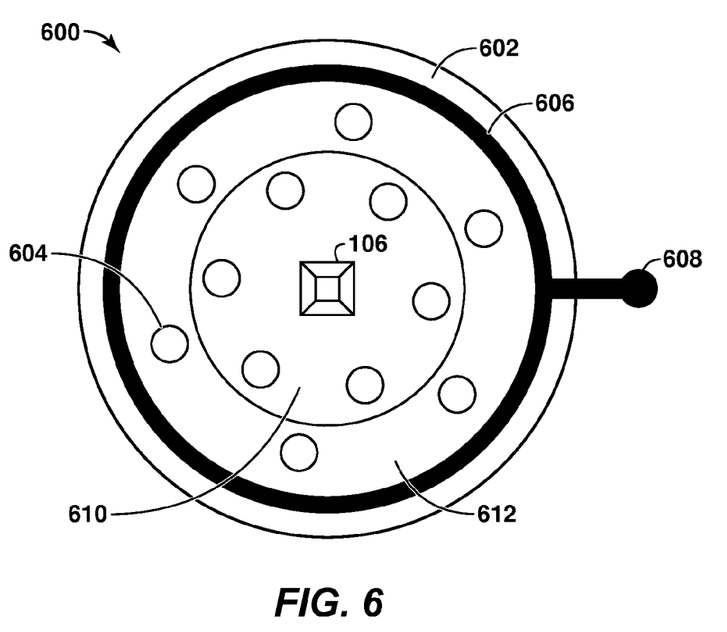
FIG. 6 is a bottom view of an arctic walking system according to a further embodiment of the present disclosure.

FIG. 6 is a bottom view of an arctic walker 600 according to a further embodiment of the present disclosure. Again, arctic walker 600 contains many of the components depicted in FIG. 1; however, for clarity, a majority of the common components are not depicted in FIG. 6. As depicted, alternate hull design 602 has a plurality of deployable wheels 604 positioned on both the bottom 610 and angled portion 612 of the hull. In the depicted embodiment, angled portion 612 is the section of the hull 602 between the deck and bottom.

Unlike the previously depicted embodiments, hull 602 includes a cutter track or opening 606 which extends around the entire perimeter of the hull 602. Opening 606 enables ice cutter 608 to be moved or positioned in any direction based on arctic walker system control. The configuration of arctic walker 600 allows for the ice cutter 608 to be moved into the direction of the ice flow instead of altering the orientation of the entire arctic walker. In the depicted embodiment, opening 606 is provided in the hull 602. In other embodiments, the ice cutter 608 may extend from the deck of the hull 602, thereby removing the need for an opening in the hull itself. In such an embodiment, a track may also be provided on the hull deck to allow for quick and efficient movement of the ice cutter.

While the depicted embodiments utilize deployed wheels to enable the arctic walker to traverse over moving ice, other embodiments may utilize any known land propulsion mechanisms and techniques to facilitate movement of the arctic walker. For example, the artic walker may utilize a plurality of continuous tracks to move the arctic walker. Some embodiments of the present disclosure may utilize different systems of vehicle propulsion on a single arctic walker. For example, wheels may be used on the underside of the artic walker hull and continuous tracks may be utilized on the angled portion of the hull. In such an embodiment, the continuous tracks would be constructed and arranged to enable the arctic walker to ride onto the ice and the deployed wheels would allow the arctic walker to drive on top of the ice.

Figure 7:
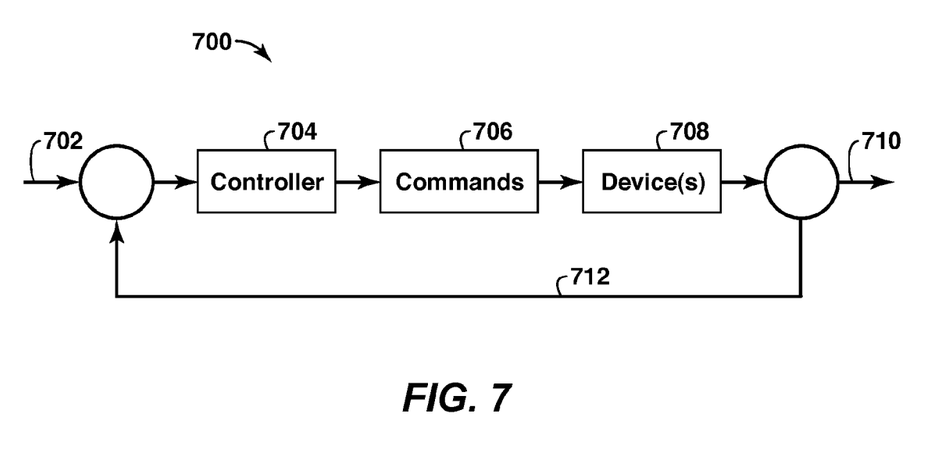
FIG. 7 illustrates a control system for use with an arctic walking system according to one embodiment of the present disclosure.

FIG. 7 illustrates a control loop for a control system 700 for use with an arctic walker according to one embodiment of the present disclosure. As depicted, control system 700 comprises at least one input 702, a controller 704, at least one command 706, at least one device 708, an output or a response 710, and a feedback loop 712. The system 700 may further include sensors to measure output or response 710 and/or a user interface (not shown) to provide input 702 or control 704. The controller 704 may be manually operated or automatic and may include computer readable data or code and may be embodied on a software program. The communication system and connections between the sensors, user interface and various components within the control system 700 may be wired or wireless. In some embodiments, the control system 700 may be fully automated. In other embodiments, control system 700 may include a combination of automated and manual controls.

In one embodiment, the control system 700 is an automatic control system and includes a feedback loop 712 to provide inputs as external conditions change. In one embodiment, the control system 700 is configured to receive a variety of input parameters 702, such as, but not limited to, whether arctic walker is on ice, operational status of the water propulsion devices, ice drift direction, position of arctic walker with respect to the wellhead or riser terminus, orientation and velocity of arctic walker, current position of ice cutter, and/or current configuration of the deployed wheels.

The controller 704 may then calculate the required adjustments which need to be made to the configuration or state of the various components of the arctic walker. For example, controller 704 may determine that the arctic walker is on ice and, as a result, the water propulsion devices no longer need to be operable and that the ice cutter needs to be deployed. In another example, the controller 704 may determine adjustments need to be made to the cutter orientation in order to provide protection to the drilling or production riser or other equipment.

Based on the determination of controller 704, at least one command 706 is issued. In some embodiments, command 706 may be instructions to the independently controlled land propulsion mechanisms. In other embodiments, command 706 may be instructions regarding the operation or position of the ice cutter. For example, command 706 may instruct land propulsions mechanisms and/or water propulsion devices to operate such that ice cutter is positioned to oppose the ice drift direction. In embodiments in which the ice cutter is on a track, command 706 may instruct the ice cutter to independently move in position to oppose the ice drift direction. In further embodiments, command 706 may be instructions regarding operation of water propulsion devices. Regardless of specific command 706, a response 710 in the configuration or operation of the arctic walker will be produced. Sensors and other feedback devices may then provide input 702 to the system 700 after the response 710 is applied so the system 700 may make adjustments for the changing conditions and any possible errors encountered.

It is important to note that the components and steps depicted in FIG. 7 are provided for illustrative purposes only and a particular component or step may not be required in the inventive control system. For example, in some embodiments of the present disclosure, feedback loop 712 may be excluded. The claims, and only the claims, define the inventive system and methodology.

Embodiments of the present invention also relate to an apparatus for performing the operations herein, such as, but not limited to, controller 704. This apparatus may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. In one embodiment, the disclosed methodologies and techniques may be used to extract hydrocarbons from a subsurface region. In one embodiment, an arctic walker is provided and properly positioned with respect to a prospective hydrocarbon reservoir within a subsurface region. In some embodiments, hydrocarbon extraction may then be conducted to remove hydrocarbons from the subsurface region, which may be accomplished by drilling a well using oil drilling equipment onboard an arctic walker. With the exception of the arctic walker and station-keeping capabilities described herein, the equipment and techniques used to drill a well and/or extract the hydrocarbons are well known by those skilled in the relevant art. Other hydrocarbon extraction activities and, more generally, other hydrocarbon management activities, may be performed according to known principles.

The following lettered paragraphs represent non-exclusive ways of describing embodiments of the present disclosure.

A. A marine vessel comprising: a hull having a height defining a first length; a plurality of land propulsion mechanisms positioned adjacent to the hull; a plurality of water propulsion devices connected to the hull; an ice cutter operatively connected to the vessel, the ice cutter having an ice cutter length greater than the first length; and a control system operatively connected to the plurality of land propulsion mechanisms, the ice cutter and the plurality of water propulsion devices, the control system is constructed and arranged to control the position of the vessel with respect to the wellhead by operation of the plurality of land propulsion mechanisms or the plurality of water propulsion devices or a combination thereof.

B. The marine vessel of paragraph A further comprising a riser operatively connecting the vessel to a subsea wellhead, the riser has a first diameter, wherein the ice cutter has a second diameter larger than the first diameter.

C. The marine vessel of any preceding paragraph, wherein the land propulsions mechanisms are constructed and arranged to enable the vessel of traversing along a body of ice.

D. The marine vessel of any preceding paragraph, wherein the land propulsion mechanisms are wheels.

E. The marine vessel of paragraphs A, B or C, wherein the land propulsion mechanisms are continuous tracks.

F. The marine vessel of paragraphs C, D or E, wherein the ice cutter is constructed and arranged to cut a riser path into the body of ice as the vessel traverses the body of ice.

F. The marine vessel of paragraphs B, C, D, E or F, wherein the riser is a drilling riser and the subsea wellhead is constructed and arranged to enable the drilling of a subsea well.

G. The marine vessel of any preceding paragraph, wherein the water propulsion devices are selected from the group consisting of propellers, thrusters, propulsors, and water jets.

H. The marine vessel of any preceding paragraph, wherein the control system is an automatic control system.

I. The marine vessel of paragraph H, wherein the automatic control system comprises a controller.

J. The marine vessel of paragraphs H or I, wherein the automatic control system includes at least one input parameter.

K. The marine vessel of paragraph J, wherein the at least one input parameter is selected from the group consisting of: location of the marine vessel, operational status of the water propulsion devices, ice drift direction, orientation and velocity of the marine vessel, position of the ice cutter, operational status of the land propulsion mechanisms, and current configuration of the land propulsion mechanisms.

L. The marine vessel of any preceding paragraph, wherein the marine vessel is constructed and arranged to enable drilling of a subsea well.

M. The marine vessel of any preceding paragraph, wherein the vessel is configured to produce hydrocarbons from a subsea formation.

AA. A method of drilling a subsea well comprising: positioning a vessel in a body of water having pack ice drifting in a first direction, the vessel comprises: a hull having a height defining a first length, a plurality of land propulsion mechanisms positioned adjacent to the hull; a plurality of water propulsion devices connected to the hull, and an ice cutter operatively connected to the vessel, the ice cutter having an ice cutter length greater than the first length; operatively connecting the vessel to a subsea wellhead, wherein the subsea wellhead is constructed and arranged to enable the drilling of the subsea well; determining the position of the vessel with respect to the pack ice; operating the vessel utilizing the plurality of land propulsion mechanisms or water propulsion devices or a combination thereof based on the determination of the vessel position; and operating the ice cutter to cut a path in the pack ice based on the determination of the vessel position.

BB. The method of paragraph AA, wherein the vessel further comprises a control system operatively connected to the plurality of land propulsion mechanisms, the ice cutter and the plurality of water propulsion devices.

CC. The method of any preceding paragraph further comprising positioning the ice cutter to oppose the first direction.

AAA. A method of producing hydrocarbons comprising: positioning a vessel in a body of water having pack ice drifting in a first direction, the vessel comprises: a hull having a height defining a first length, a plurality of land propulsion mechanisms positioned adjacent to the hull; a plurality of water propulsion devices connected to the hull, and an ice cutter operatively connected to the vessel, the ice cutter having an ice cutter length greater than the first length; operatively connecting the vessel to a subsea wellhead, wherein the subsea wellhead is constructed and arranged to produce hydrocarbons; determining the position of the vessel with respect to the pack ice; operating the vessel utilizing the plurality of land propulsion mechanisms or water propulsion devices or a combination thereof based on the determination of the vessel position; operating the ice cutter to cut a path in the pack ice based on the determination of the vessel position; receiving the hydrocarbons into the vessel.

BBB. The method of paragraph AAA, wherein the vessel further comprises a control system operatively connected to the plurality of land propulsion mechanisms, the ice cutter and the plurality of water propulsion devices.

CCC. The method of any preceding paragraph further comprising positioning the ice cutter to oppose the first direction.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

References

API (2005), Design and Analysis of Stationkeeping Systems for Floating Structures, *API Recommended Practice 2SK*, Third Edition, October 2005.

Hamilton J. M., Holub C. J., Blunt J., Mitchell D., and Kokkinis T. (2011a), "Ice Management for Support of Arctic Floating Operations," Proceedings of first Arctic Technology Conference, Feb. 7-9, Houston, Tex.

Hamilton J. M., Holub C. J. and Blunt J. (2011b), "Simulation of Ice Management Fleet Operations Using Two Decades of Beaufort Sea Ice Drift and Thickness Time Histories", Proceedings of the Twenty First International Offshore and Polar Engineering Conference, Maui, Hi., Jun. 19-24, 2011.

Maddock, B., Bush, A., Wojahn, T., Kokkinis, T., Younan, A. and Hawkins, J. R. (2011), "Advances in Ice Management for Deepwater Drilling in the Beaufort Sea," POAC 11-50, Proceedings of the 21st International Conference on Port and Ocean Engineering under Arctic Conditions, Jul. 10-14, 2011, Montréal, Canada.

Wetmore, S. B. (1984), "The Concrete Island Drilling System: Super Series (Super CIDS), OTC 4801, *Proc. of the 16th Annual Offshore Technology Conference*, Houston, Tex., May 7-9, 1984.

What is claimed is:

1. A marine vessel comprising:
a hull having a height defining a first length;
a plurality of land propulsion mechanisms positioned adjacent to the hull;
a plurality of water propulsion devices connected to the hull;
an ice cutter operatively connected to the vessel, the ice cutter having an ice cutter length greater than the first length to cut an opening in an ice floe sufficient for a riser to slide through as the ice floe passes under the hull; and
a control system operatively connected to the plurality of land propulsion mechanisms, the ice cutter and the plurality of water propulsion devices, the control system is constructed and arranged to control the position of the vessel with respect to a wellhead by operation of the plurality of land propulsion mechanisms or the plurality of water propulsion devices or a combination thereof.

2. The marine vessel of claim 1, wherein the land propulsion mechanisms are constructed and arranged to enable the vessel to traverse over the ice floe.

3. The marine vessel of claim 2, wherein the land propulsion mechanisms are wheels.

4. The marine vessel of claim 1, wherein the riser is a drilling riser and the wellhead is constructed and arranged to enable the drilling of a subsea well.

5. The marine vessel of claim 1, wherein the control system is an automatic control system.

6. The marine vessel of claim 5, wherein the automatic control system comprises a controller.

7. The marine vessel of claim 5, wherein the automatic control system includes at least one input parameter.

8. The marine vessel of claim 7, wherein the at least one input parameter is selected from the group consisting of: location of the marine vessel, operational status of the water propulsion devices, ice drift direction, orientation and velocity of the marine vessel, position of the ice cutter, operational status of the land propulsion mechanisms, and current configuration of the land propulsion mechanisms.

9. The marine vessel of claim 1, wherein the marine vessel is constructed and arranged to enable drilling of a subsea well.

10. The marine vessel of claim 1, wherein the vessel is configured to produce hydrocarbons from a subsea formation.

11. The marine vessel of claim 1, wherein the ice cutter is configured to be moved in any direction around the perimeter of the hull.

12. A method of drilling a subsea well comprising:
positioning a vessel in a body of water having pack ice drifting in a first direction, the vessel comprises:
a hull having a height defining a first length,
a plurality of land propulsion mechanisms positioned adjacent to the hull;
a plurality of water propulsion devices connected to the hull, and
an ice cutter operatively connected to the vessel, the ice cutter having an ice cutter length greater than the first length to cut an opening in the pack ice sufficient for a riser to slide through as the pack ice passes under the hull;
operatively connecting the vessel to a subsea wellhead, wherein the subsea wellhead is constructed and arranged to enable the drilling of the subsea well;
determining the position of the vessel with respect to the pack ice;
operating the vessel utilizing the plurality of land propulsion mechanisms or water propulsion devices or a combination thereof based on the determination of the vessel position; and
operating the ice cutter to cut a path in the pack ice based on the determination of the vessel position.

13. The method of claim 12, wherein the vessel further comprises a control system operatively connected to the plurality of land propulsion mechanisms, the ice cutter and the plurality of water propulsion devices.

14. The method of claim 13 further comprising positioning the ice cutter to oppose the first direction.

15. The method of claim 12, wherein the ice cutter is configured to be moved in any direction around the perimeter of the hull.

16. A method of producing hydrocarbons comprising:
positioning a vessel in a body of water having pack ice drifting in a first direction, the vessel comprises:
a hull having a height defining a first length,
a plurality of land propulsion mechanisms positioned adjacent to the hull;
a plurality of water propulsion devices connected to the hull, and an ice cutter operatively connected to the vessel, the ice cutter having an ice cutter length greater than the first length to cut an opening in the pack ice sufficient for a riser to slide through as the ice pack passes under the hull;

operatively connecting the vessel to a subsea wellhead, wherein the subsea wellhead is constructed and arranged to produce hydrocarbons;

determining the position of the vessel with respect to the pack ice;

operating the vessel utilizing the plurality of land propulsion mechanisms or water propulsion devices or a combination thereof based on the determination of the vessel position;

operating the ice cutter to cut a path in the pack ice based on the determination of the vessel position;

receiving the hydrocarbons into the vessel.

17. The method of claim 16, wherein the vessel further comprises a control system operatively connected to the plurality of land propulsion mechanisms, the ice cutter and the plurality of water propulsion devices.

18. The method of claim 16 further comprising positioning the ice cutter to oppose the first direction.

19. The method of claim 18, wherein the ice cutter is configured to be moved in any direction around the perimeter of the hull.

* * * * *